US008713547B2

(12) United States Patent
Gschwind et al.

(10) Patent No.: US 8,713,547 B2
(45) Date of Patent: Apr. 29, 2014

(54) GENERATING COMPILED CODE THAT INDICATES REGISTER LIVENESS

(71) Applicant: International Business Machines Corporation, Armonk, NY (US)

(72) Inventors: Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/664,595

(22) Filed: Oct. 31, 2012

(65) Prior Publication Data

US 2013/0086548 A1   Apr. 4, 2013

Related U.S. Application Data

(63) Continuation of application No. 13/251,803, filed on Oct. 3, 2011.

(51) Int. Cl.
*G06F 9/45* (2006.01)
(52) U.S. Cl.
USPC .......................................... 717/151; 717/146
(58) Field of Classification Search
None
See application file for complete search history.

(56) References Cited

U.S. PATENT DOCUMENTS

| 5,339,431 A | 8/1994 | Rupp et al. |
| 5,469,572 A | 11/1995 | Taylor |
| 5,797,014 A | 8/1998 | Gheith |
| 6,071,317 A | 6/2000 | Nagel |
| 6,243,864 B1 | 6/2001 | Odani et al. |
| 6,408,433 B1 * | 6/2002 | Click et al. ..................... 717/154 |
| 6,457,174 B1 | 9/2002 | Kuroda et al. |
| 6,687,899 B1 | 2/2004 | Shann |
| 6,704,928 B1 | 3/2004 | Shann |
| 6,718,546 B1 | 4/2004 | Johnson |
| 6,859,932 B1 | 2/2005 | Shann |

(Continued)

FOREIGN PATENT DOCUMENTS

| CN | 1838088 A | 9/2006 |
| CN | 101520737 A | 9/2009 |
| CN | 101630269 A | 1/2010 |
| JP | 2002182926 A | 6/2002 |

OTHER PUBLICATIONS

Software-Directed Register Deallocation for Simultaneous Multithreaded Processors, Jack L. Lo, Sujay S. Parekh, Susan J. Eggers, Henry M. Levy, and Dean M. Tullsen, Published: 1999.*

(Continued)

*Primary Examiner* — Emerson Puente
*Assistant Examiner* — Paul Mills
(74) *Attorney, Agent, or Firm* — Cantor Colburn LLP; John Campbell

(57) ABSTRACT

Object code is generated from an internal representation that includes a plurality of source operands. The generating includes performing for each source operand in the internal representation determining whether a last use has occurred for the source operand. The determining includes accessing a data flow graph to determine whether all uses of a live range have been emitted. If it is determined that a last use has occurred for the source operand, an architected resource associated with the source operand is marked for last-use indication. A last-use indication is then generated for the architected resource. Instructions and the last-use indications are emitted into the object code.

9 Claims, 9 Drawing Sheets

(56) References Cited

U.S. PATENT DOCUMENTS

| | | |
|---|---|---|
| 6,901,584 B2 | 5/2005 | Shann |
| 7,168,069 B1 | 1/2007 | Sigmund |
| 7,412,710 B2 | 8/2008 | Oliva |
| 8,180,964 B1 | 5/2012 | Koh et al. |
| 2002/0073398 A1 | 6/2002 | Tinker |
| 2002/0095669 A1* | 7/2002 | Archambault ............... 717/157 |
| 2002/0138824 A1 | 9/2002 | Shann |
| 2003/0009750 A1 | 1/2003 | Hundt et al. |
| 2003/0079210 A1* | 4/2003 | Markstein et al. ............ 717/152 |
| 2004/0049667 A1 | 3/2004 | McCormick, Jr. et al. |
| 2007/0226717 A1 | 9/2007 | Shtilman et al. |
| 2007/0226720 A1* | 9/2007 | Chen et al. .................... 717/151 |
| 2007/0277162 A1 | 11/2007 | Tanaka et al. |
| 2009/0193400 A1* | 7/2009 | Baev et al. .................... 717/140 |
| 2011/0138372 A1 | 6/2011 | Damron |

OTHER PUBLICATIONS

Interprocedural Dataflow Analysis in an Executable Optimizer, David W. Goodwin, Published: 1997.*

Scratch-pad Memory Management for Static Data Aggregates, Lian Li, Title, Abstract, and Chapters 2 and 3, Published: 2007.*

ALTO: A Platform for Object Code Modification, Robert Muth, Title, Abstract, and Chapter 3, Published: 1999.*

Exploring the Limits of Early Register Release: Exploiting Compiler Analysis, Timothy M. Jones, Michael O'Boyle, Jaume Abella, Antonio Gonzalez, and Oguz Ergin, Published: 2009.*

Light Weight Optimizations for Reducing Hot Saves and Restores of Callee-Saved Registers, Gad Haber, Moshe Klausner, Bilha Mendelson and Vadim Eisenberg, Published: 2001.*

Machine-Code Generation for Functions, Cosmin Oancea, Published: 2012.*

PCT International Search Report and Written Opinion, International Appl. No. PCT/IB2012/055255, International Filing date: Oct. 1, 2012, Date of Mailing: Feb. 7, 2013, 7 pages.

PCT International Search Report and Written Opinion, International Appl. No. PCT/IB2012/055252, International Filing Date: Oct. 1, 2012, Date of Mailing: Feb. 7, 2013, 7 pages.

PCT International Search Report and Written Opinion, International Appl. No. PCT/IB2012/054809, International Filing date: Sep. 14, 2012, Date of Mailing: Feb. 28, 2013, 10 pages.

Niranjan Hasabnis, "Infrastructure for Architecture-Independent Binary Analysis and Transformation," 2011, 52 pages.

William A. Wuff, "Compilers and Computer Architecture," 1981, 7 pages.

Adve et al., "Changing Interaction of Compiler and Architecture", 1997, 8 pages.

Muth et al., "A Link-Time Optimizer for the DEC Alpha", 1998, 29 pages.

U.S. Appl. No. 13/251,803; Non-Final Office Action; Date Filed: Oct. 3, 2011; Date Mailed: Jun. 5, 2013, pp. 1-24.

* cited by examiner

GENERATING COMPILED CODE THAT INDICATES REGISTER LIVENESS

CROSS-REFERENCE TO RELATED APPLICATION

This application is a continuation of U.S. patent application Ser. No. 13/251,803, filed Oct. 3, 2011, the content of which is hereby incorporated by reference in its entirety.

BACKGROUND

The present invention relates to computer systems, and more specifically, to generating compiled code that indicates register liveness.

In computer architecture, a processor register is a small amount of storage available as part of a central processing unit (CPU) or other digital processor. Such registers are addressed by mechanisms other than main memory and typically can be accessed more quickly than main memory. Almost all computers load data from a larger memory into registers where it is used for arithmetic, manipulated, or tested, by some machine instruction. Manipulated data is then often stored back in main memory, either by the same instruction or a subsequent one. Modern processors use either static random access memory (RAM) or dynamic RAM as main memory, the latter often being implicitly accessed via one or more cache-levels. A common property of computer programs is locality of reference: the same values are often accessed repeatedly and holding frequently used values in registers improves performance. Processor registers are normally at the top of the memory hierarchy, and provide the fastest way to access data. The term processor register refers to the group of registers that are directly encoded as part of an instruction, as defined by the instruction set. Allocating frequently used variables to registers can be critical to a program's performance.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries and so on. Several ABIs (e.g., the Interactive Unix ABI allowing to a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

"Power ISA™ Version 2.06 Revision B" published Jul. 23, 2010 from IBM® and incorporated by reference herein in its entirety teaches an example reduced instruction set computer (RISC) instruction set architecture (ISA). The Power ISA will be used herein in order to demonstrate example embodiments, however, the invention is not limited to Power ISA or RISC architectures, Those skilled in the art will readily appreciate use of the invention in a variety of architectures.

"z/Architecture Principles of Operation" SA22-7832-08, Ninth Edition (August, 2010) from IBM® and incorporated by reference herein in its entirety teaches an example CISC (complex instruction set computer) instruction set architecture, "64-bit PowerPC ELF Application Binary Interface Supplement 1.9" (2004) from IBM and incorporated by reference herein in its entirety describes the 64-bit supplement to the PowerPC® Executable and Linking Format (ELF) ABI.

"Power Architecture® 32-bit Application Binary Interface Supplement 1.0 Linux®" (Apr. 19, 2011) and "Power Architecture® 32-bit Application Binary Interface Supplement 1.0-Embedded" (Apr. 19, 2011) from power.org and incorporated by reference herein in their entirety describe the 32-bit ABI.

SUMMARY

According to exemplary embodiments, a computer program product and system include generating, by a computer, object code from an internal representation that includes a plurality of source operands. The generating includes performing for each source operand in the internal representation determining whether a last use has occurred for the source operand. The determining includes accessing a data flow graph to determine whether all uses of a live range have been emitted. If it is determined that a last use has occurred for the source operand, an architected resource associated with the source operand is marked for last-use indication. A last-use indication is then generated for the architected resource. Instructions and the last-use indications are emitted into the object code.

According to additional exemplary embodiments, a computer program product and system include inserting a prologue into a called function that is configured to be called from a calling function. The prologue is configured to execute upon called function entry and includes an instruction to store a liveness status of registers. In addition, an epilogue is inserted into the called function. The epilogue is configured to execute upon called function exit and includes an instruction configured to restore the liveness status of registers stored by the prologue.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
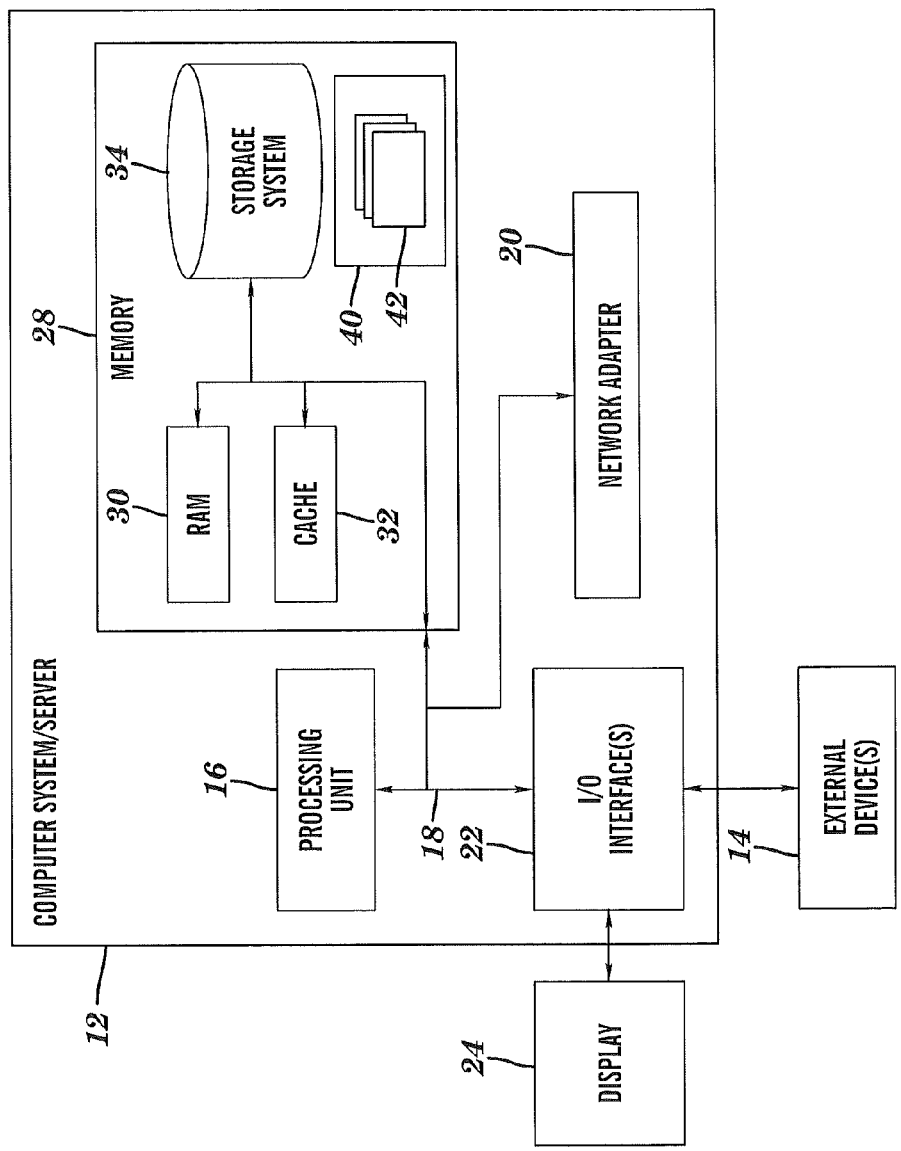
FIG. 1 illustrates a cloud computing node according to an embodiment of the present invention.

In contemporary computing systems, registers have become a relatively scarce resource. Having the ability to detect and to release unused registers from an executing program will help to ensure that only required registers are allocated to the program. This may lead to a reduced amount of contention for the registers and/or for additional data items to be stored in the registers (to take advantage of the quick access speeds). In addition, registers that are marked as unused may be removed from back-up and recovery operations and thus eliminate any unneeded overhead associated with these operations.

An embodiment of the present invention is directed to generating object code that indicates a liveness status of a register(s). As used herein, the term "liveness status" refers to whether an architected register will be used again as a source operand by the program under execution. A liveness status of "live" or "used" means that a future instruction within the program may seek to retrieve the value stored in the register along at least one program execution path starting from the point at which the register is "live" or "used". A liveness status of "unused" or "dead" means that no instruction within the program will need to retrieve the value stored in the register along any of the program execution paths starting from the point at which the register is "unused" or "dead".

In an embodiment described herein, a compiler performs a liveness analysis to determine when to insert a last-use indicator into object code to indicate that a register will no longer be in use once the instruction has completed (i.e., the register will be unused). In addition, object code instructions may be inserted into a prologue of a called function to capture a calling program liveness status of non-volatile registers being updated by the called function; and corresponding object code instructions inserted into an epilogue of the called function to restore the calling program liveness status upon return to the calling program. Further object code instructions may be inserted into the prologue to mark volatile non-parameter registers as unused upon function entry. In addition, further object code instructions may be inserted into the epilogue to mark volatile registers (excluding result registers) as unused upon function exit.

The insertion of last-use indicators in compiled code may be tailored to reduce indicators of non-use for short code intervals. For example, the compiler may decide not to generate a last-use indicator for a register when a new value will be written to the register within a short period of time. The compiler may balance the diminishing returns (e.g., in terms of performance and reliability) of short span de-allocation of a register with code bloat (e.g., caused by an additional instruction) when deciding whether or not to insert a last-use indicator into an object code program.

Two new object code instructions are described herein, one to store a liveness vector into memory and another to load a liveness vector from memory. These new instructions are utilized to store a liveness status of registers upon entry into a called function and to restore the liveness status of the registers upon exit from the called function.

United States Patent Application titled "Computer Instructions for Activating and Deactivating Operands", Ser. No. 13/251,458 (IBM #'149, filed Oct. 3, 2011 is incorporated herein by reference in its entirety. United States Patent Application titled "Prefix Computer Instruction for Compatibly Extending Instruction Functionality", Ser. No. 13/251,426 (IBM #'156, filed Oct. 3, 2011 is incorporated herein by reference in its entirety. United States Patent Application titled "Tracking Operand Liveliness Information in a Computer System and Performing Function Based on the Liveliness Information", Ser. No. 13/251,441 (IBM #'159, filed Oct. 3, 2011 is incorporated herein by reference in its entirety.

The generation of instructions to indicate a liveness status of an architected resource may be performed in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
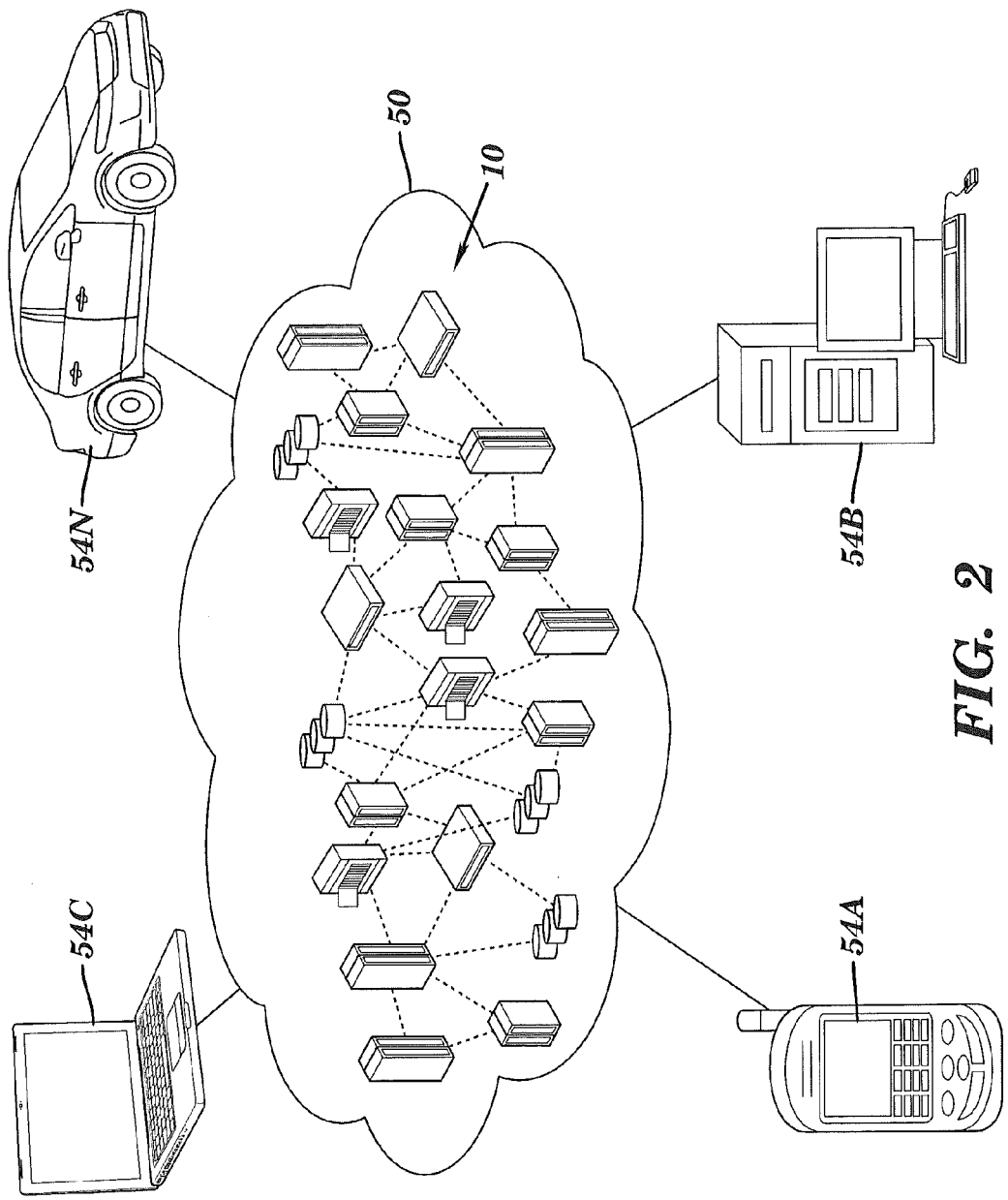
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
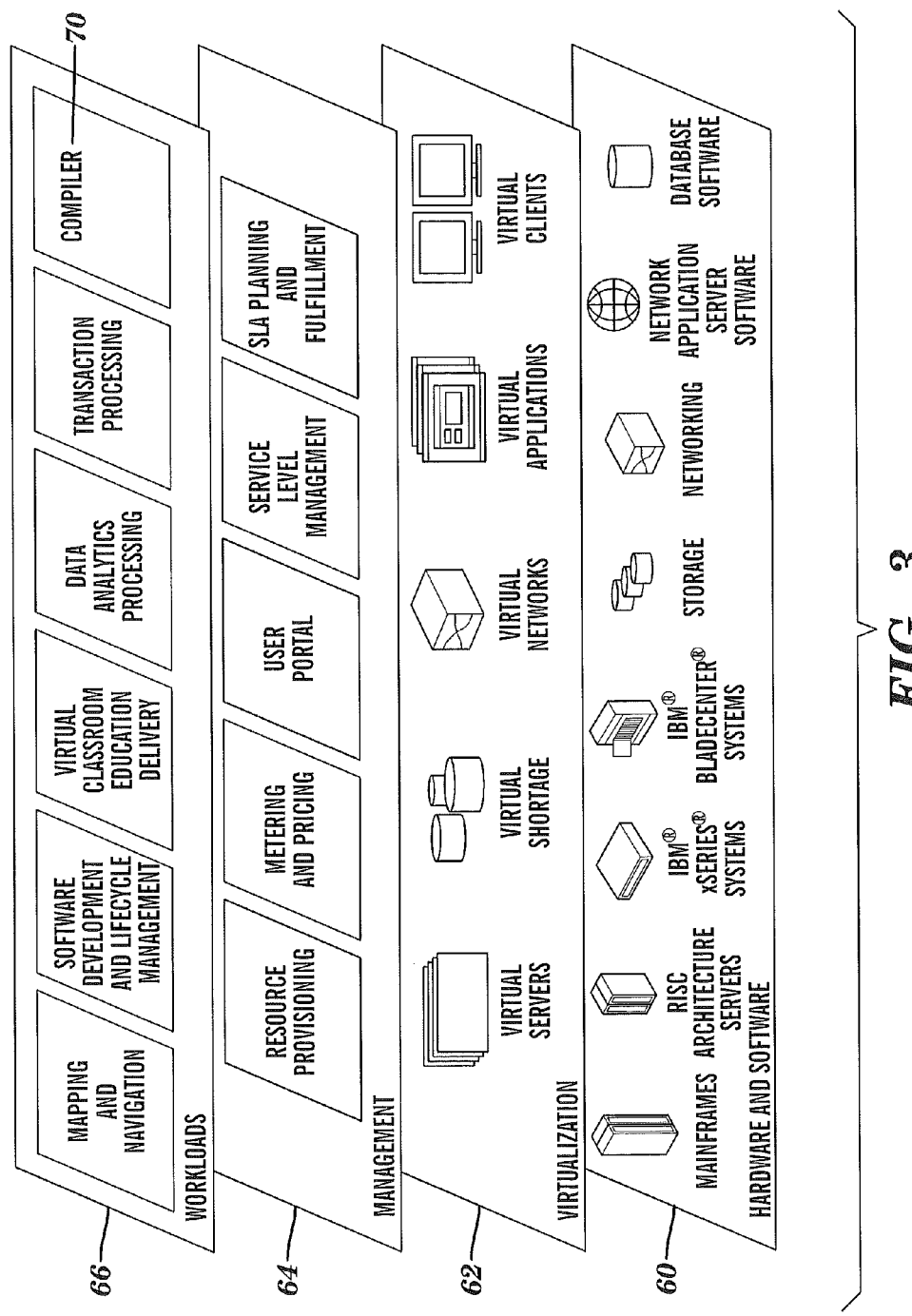
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

In an exemplary embodiment, an enhanced compiler 70 in the workloads layer 66 performs the processing described herein; however, it will be understood that the enhanced compiler 70 may be implemented in any layer and may be used to generate code to be executed on a variety of hardware platforms in the hardware and software layer 60.

In one embodiment, the enhanced compiler 70 generates code for execution on a processing unit 16 of a computer system/server 12 executing in a cloud environment 50, or on a system 54A, 54B or 54C adapted to develop applications for a cloud environment 50. The generated code is stored in a storage medium such as virtual storage 62, external device 14, or another solution such as internally installed system flash memory.

Figure 4:
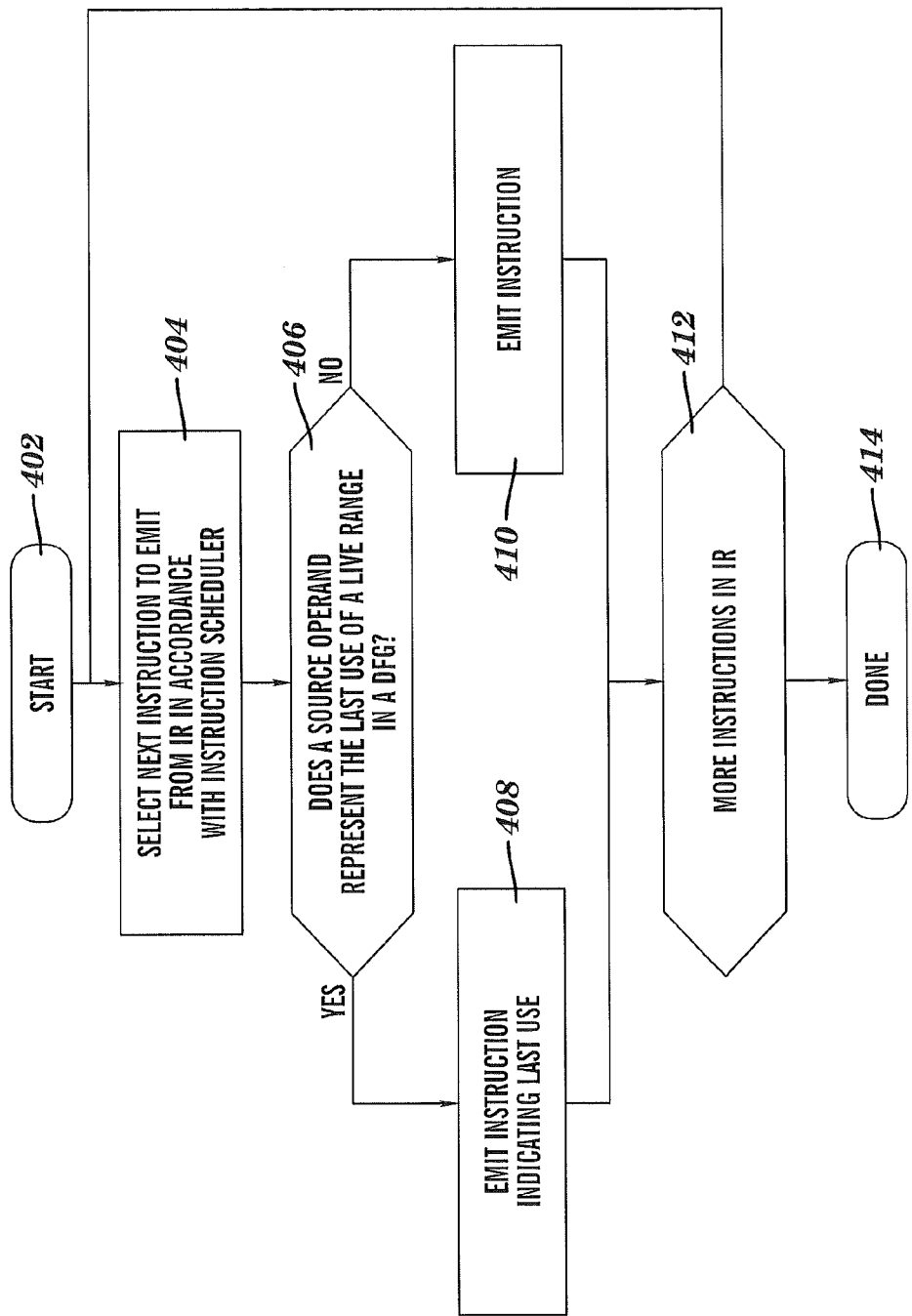
FIG. 4 illustrates a flow diagram of a process performed by a compiler to generate object code that includes register liveness indicators in accordance with an embodiment of the present invention.

Turning now to FIG. 4, a flow diagram of a process performed by the enhanced compiler 70 to generate object code that includes register liveness indicators in accordance with an embodiment is generally shown. The process shown in FIG. 4 indicates a last-use of a register as part of an existing instruction. In accordance with this embodiment, the compiler generates code for an instruction set that has been augmented to include an indicator that at least one operand of the instruction will be unused after the instruction. This indication can be performed as being encoded as part of the operation code (opcode) of the instruction, as a flag associated with the register, or as a mask where separate mask bits correspond to each of a plurality of registers for the purpose of indicating last use for each of the corresponding registers. In one embodiment, the operation code, flag or mask is directly specified in the instruction. In another embodiment, the opcode, flag or mask is specified as a prefix instruction (i.e., a separate instruction preceding the instruction), an instruction prefix (i.e., an indicator preceding the instruction), a postfix instruction (i.e., a separate instruction following the instruction), or as an instruction postfix (i.e., an indicator following the instruction).

Referring to FIG. 4, the process starts at block 402, and at block 404 a next instruction to be written into object code is selected in accordance with an instruction scheduler in the compiler. The next instruction is selected from internal representations (IRs) of one or more instructions. It is determined, at block 406, whether a source operand in the next instruction represents the last use of a live range (i.e., a register value in accordance with the register allocation of live ranges performed by the compiler to registers, in accordance with prior art) in a data flow graph (DFG). As used herein, the term "DFG" refers to any sort of structure for capturing the allocation of values to registers (or other architected resources). The compiler queries a DFG and determines for each source operand of an instruction whether it corresponds to a last use (i.e., by determining whether instructions for all other uses of a specific symbolic value (i.e., the live range) allocated to an architected register have been emitted). This process of determining a last use of a register may be performed in conjunction with instruction scheduling or in a step after instruction scheduling as shown in FIG. 4.

If it is determined, at block 406, that the source operand represents a last use of a register, then processing continues at block 408 where a last-use indicator is added to the instruction before it is emitted (added) to the object code. In the embodiment shown in FIG. 4, one or more bits are added to an existing instruction to indicate a last use of the register containing the source operand. Processing then continues at block 412 to determine if there are more instructions in an IR for inclusion in the object code. If there are no additional instructions, then the process completes at block 414. If there are additional instructions, then processing continues at block 404, where a next instruction is selected.

If it is determined, at block 406, that the source operand does not represent a last use of a register, then processing continues at block 410 where the selected instruction is emitted to the object code. Processing then continues at block 412 to determine if there are more instructions in an IR for inclusion in the object code. If there are no additional instructions, then the process completes at block 414. If there are additional instructions, then processing continues at block 404, where a next instruction is selected.

Figure 5:
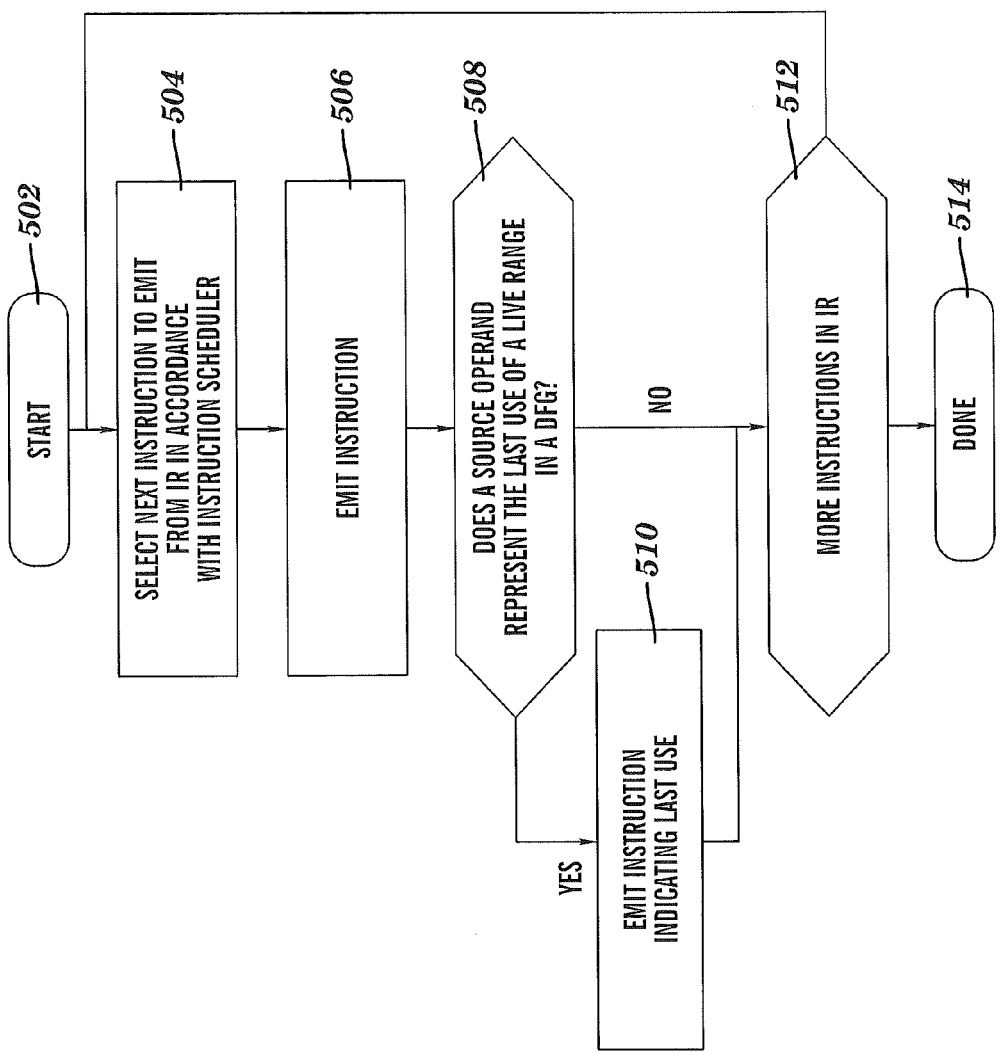
FIG. 5 illustrates a flow diagram of a process performed by a compiler to generate object code that includes a register liveness indicator instruction in accordance with an embodiment of the present invention.

Turning now to FIG. 5 illustrates a flow diagram of a process performed by the enhanced compiler 70 to generate object code that includes register liveness indicator instructions in accordance with an embodiment is generally shown. The process shown in FIG. 5 inserts a separate instruction to indicate a last use of a register, and thus causes the object code, when executed, to incur the additional costs (e.g., cache, cycle time, etc.) associated with processing an additional instruction. This approach is preferable to extending a large set of instructions with additional indicators, or to avoid the architectural or micro-architectural complications associated with the implementation of instruction prefixes, prefix instructions, instruction postfixes, and postfix instruction that must be used to augment an instruction. Advantageously, only a single instruction, or a small set of instructions to indicate a last use of one or a plurality of instruction is added to the instruction set in accordance with this indication method.

Referring to FIG. 5, the process starts at block 502, and at block 504 a next instruction to be written into object code is selected in accordance with an instruction scheduler in the compiler. The next instruction is selected from IRs of one or more instructions. The next instruction is emitted at block 506. It is determined, at block 508, whether a source operand in the emitted next instruction of block 506 represents the last use of a live range (i.e., a register value) in a DFG. The process of determining a last use of a register is preferably performed in conjunction with instruction scheduling as the emission of an additional instruction will impact the schedule.

If it is determined, at block 508, that the source operand represents a last use of a register, then processing continues at block 510 where an instruction indicating a last-use of the register is emitted (added) to the object code. Processing then continues at block 512 to determine if there are more instructions in an IR for inclusion in the object code. If there are no additional instructions, then the process completes at block 514. If there are additional instructions, then processing continues at block 504, where a next instruction is selected.

If it is determined, at block 506, that the source operand does not represent a last use, then processing continues at block 512 to determine if there are more instructions in an IR for inclusion in the object code. If there are no additional instructions, then the process completes at block 514. If there are additional instructions, then processing continues at block 504, where a next instruction is selected.

Figure 6:
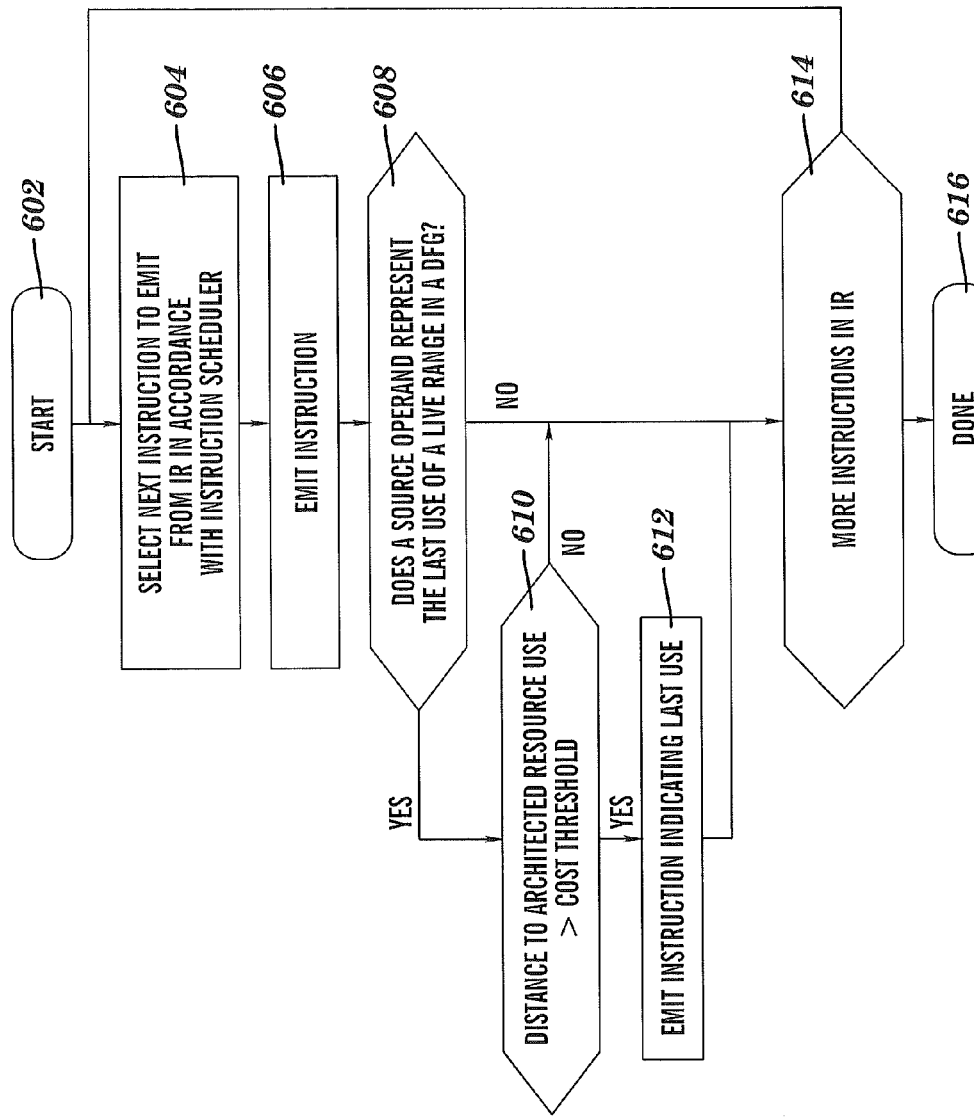
FIG. 6 illustrates a flow diagram of a process performed by a compiler to generate object code that includes a last-use indicator in accordance with an embodiment of the present invention.

Turning now to FIG. 6, a flow diagram of process performed by a compiler to generate object code that inserts a last-use indicator in accordance with an embodiment is generalshown. The process shown in FIG. 6 may be performed by the enhanced compiler 70. As shown in the process in FIG. 6, a test is performed to verify that emitting a last-use indicator instruction presents an attractive tradeoff before adding a last-use indicator instruction to the object code. Tradeoffs considered may include the performance advantages achieved by releasing (de-allocating) registers versus the cost of issuing the additional instruction and/or the cost of re-allocating the released registers when they are used again. Tradeoffs may also involve improved reliability and availability due to reducing the cost of recovering transient faults in registers that hold no useful values. Tradeoff checking may be performed by the compiler by comparing an expected metric (performance, reliability) against a threshold. The metric may be the number of instructions until a next write occurs to the architected resource (e.g., the register) identified in block 608 as having a last use. Alternatively or in addition, the metric may be an estimate of the performance improvement obtained from aspects such as, but not limited to: register cache management, renaming efficiency, and/or decode-time instruction optimization. The threshold may be a constant based on the microarchitecture of target processor or a plurality of different target processors or a target processor selected by the compiler user, where the constant represents a cost of issuing the additional instruction. The threshold and the metrics are programmable and may be fixed prior to the enhanced compiler 70 generating the object code, adjusted by the enhanced compiler 70 based on characteristics of the IRs, and/or tailored to particular expected operating environments of the generated object code.

Those skilled in the art will understand that in an alternate embodiment, emission of a last-use indicator may be performed after scheduling has been completed. In this case, the metric is determined as a function of the number of cycles until the next write occurs to the architected resource allocated to the value seeing a last use based on a pre-generated schedule. The threshold is determined as a function of the schedule (e.g., whether inserting the instruction will introduce additional latency into schedule).

Referring to FIG. 6, processing begins at block 602, and at block 604 a next instruction to be written into object code is selected in accordance with an instruction scheduler in the compiler. The next instruction is selected from IRs of one or more instructions. The next instruction is emitted at block 606. It is determined, at block 608, whether a source operand in the next instruction represents the last use of a live range (i.e., a register value) in a DFG.

If it is determined, at block 608, that the source operand represents a last use of a register, then processing continues at block 610, where it is determined whether a cost metric (e.g., the distance to the next write to this architected resource) corresponding to an architected resource (e.g., a register) use is greater than a cost threshold. In one embodiment, the cost metric is derived by counting the number of instructions, or IRs, until the next write to the architected register occurs. For example, in the IR sequence:
(1) add r2, r4, r5
(2) mul r2, r2, r2
(3) add r2, r2, r5
(4) addi r2, r2, 128
(5) li r4, 0 the cost metric for register r4 at IR (1) is 3 in accordance with one embodiment of a compiler where the cost metric corresponds to the distance between a last use of an architected resource and a subsequent write thereto.

If it is determined, at block 610, that the cost metric corresponding to an architected resource use is greater than a cost threshold, then processing continues at block 612 where an instruction indicating a last use of the register is emitted (added) to the object code. Processing then continues at block 614 to determine if there are more instructions in an IR for inclusion in the object code. If there are no additional instructions, then the process completes at block 616. If there are additional instructions, then processing continues at block 604, where a next instruction is selected. If it is determined, at block 610, that the distance to an architected resource use (the metric in this example) is not greater than a cost threshold, then processing continues at block 614 to determine if there are more instructions in an IR for inclusion in the object code. If there are no additional instructions, then the process completes at block 616. If there are additional instructions, then processing continues at block 604, where a next instruction is selected.

If it is determined, at block 608, that the source operand does not represent a last use of a register, then processing continues at block 614 to determine if there are more instructions in an IR for inclusion in the object code. If there are no additional instructions, then the process completes at block 616. If there are additional instructions, then processing continues at block 604, where a next instruction is selected.

If in the exemplary IR sequence above, the cost metric meets the defined threshold, a sequence of instruction corresponding to the IR, but augmented with a last-use indication instruction lu <register-number> will be emitted as follows:
add r2, r4, r5
lu r4
mul r2, r2, r2
add r2, r2, r5
addi r2, r2, 128
li r4, 0

Figure 7:
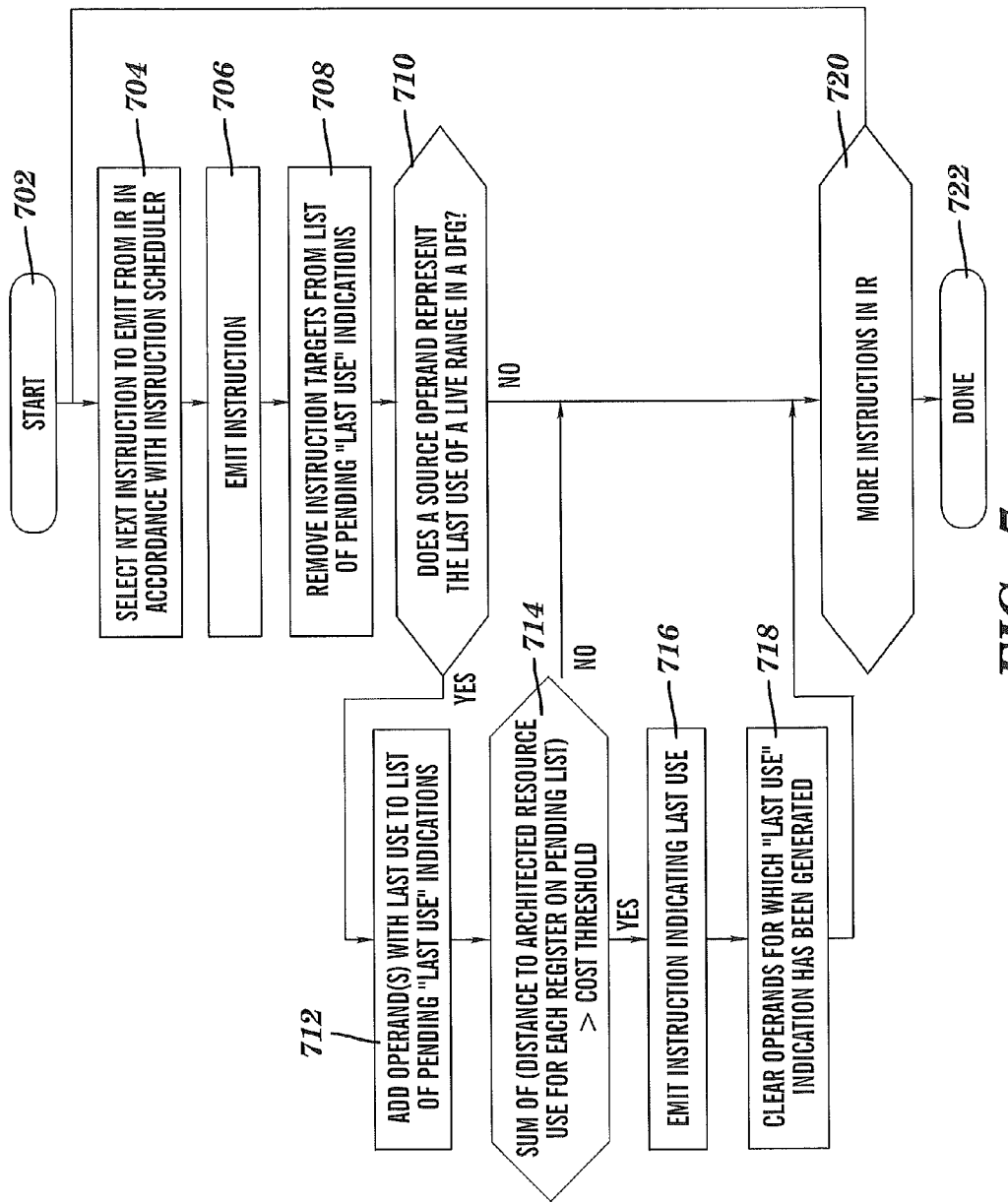
FIG. 7 illustrates a flow diagram of a process performed by a compiler that utilizes a pending list for determining when to insert a last use indicator for a plurality of instructions in accordance with an embodiment of the present invention.

Turning now to FIG. 7, a flow diagram of a process performed by a compiler that utilizes a pending list for determining when to insert a last-use indicator for a plurality of registers in accordance with an embodiment is generally shown. The process shown in FIG. 7 may be implemented by the enhanced compiler 70. The embodiment shown in FIG. 7 reduces the overhead associated with inserting last-use indicator instructions when compared to the process described in reference to FIG. 6, where a separate last-use indicator instruction is generated for each register. In the process shown in FIG. 7, a list of registers for which the last use has been seen is maintained. This list is referred to as the "pending last-use register list." A test is performed to determine that emitting a last-use indicator instruction indicating a last use for the registers on the pending last-use register list presents an attractive tradeoff before adding a last-use indicator instruction to the object code. Tradeoffs considered by the compiler may include the performance advantages achieved by releasing the registers versus the cost of issuing the additional instruction and/or the cost of re-allocating the released registers when they are used again. Tradeoffs may also involve improved reliability and availability due to reducing the cost of recovering transient faults in registers that hold no useful values. Tradeoff checking may be performed by comparing an expected metric (performance, reliability) against a threshold. The metric may be determined by adding a metric for each register on the pending last-use register list to generate a total sum metric. The metric for each individual register may be determined by determining the number of instructions until a next write occurs to the architected resource (e.g., register) seeing a last use. The metric may be an estimate of the performance improvement obtained from aspects such as, but not limited to: register cache management, renaming efficiency, and/or decode-time instruction optimization. In addition, the threshold may be a constant based on the microarchitecture of target processor, where the constant represents a cost of issuing the additional instruction. The threshold and the metrics are programmable and may be fixed prior to the enhanced compiler 70 generating the object code, adjusted by the enhanced compiler 70 based on characteristics of the IRs, and/or tailored to particular expected operating environments of the generated object code.

Those skilled in the art will understand that in an alternate embodiment, emission of a last-use indicator may be performed after scheduling has been completed. In this case, the metric is determined as a function of the number of cycles until the next write occurs to the architected resource allocated to the value seeing a last use based on a pre-generated schedule. The threshold is determined as a function of the schedule (e.g., whether inserting the instruction will introduce additional latency into schedule).

Referring to FIG. 7, processing begins at block 702, and at block 704 a next instruction to be written into object code is selected in accordance with an instruction scheduler in the compiler. The next instruction is selected from IRs of one or more instructions. The next instruction is emitted at block 706. At block 708, target registers specified in the emitted next instruction of block 706 are removed from a pending last-use register list. This corresponds to the fact that the architected register(s) of the target register(s) of the emitted next instruction are no longer corresponding to a prior live range that had become unused (or dead), but rather to the new live range that started with the write to the target register of the emitted instruction. It is determined, at block 710, whether a source operand in the next instruction represents the last use of a live range (i.e., a register value) in a DFG (and excluding all target registers of the emitted next instruction). If it is determined, at block 710, that the source operand represents a last use of a register, then processing continues at block 712, where the register is added to the pending last-use register list. At block 714, it is determined whether cumulative cost metric for all registers on the "pending last-use register" list (e.g., the sum of the distance to an architected resource—e.g., a register—use for all of the registers on the pending last-use register list) is greater than a cost threshold.

If it is determined, at block 714, that the cumulative cost metric (e.g., the sum of the distance to an architected resource use for all of the registers on the pending last use register list) is greater than a cost threshold, then processing continues at block 716 where an instruction indicating a last use of the registers on the pending last-use register list is emitted to the object code. Block 718 is performed to remove the registers from the pending last-use register list. Processing then continues at block 720 to determine if there are more instructions in an IR for inclusion in the object code. If there are no additional instructions, then the process completes at block 722. If there are additional instructions, then processing continues at block 704, where a next instruction is selected. If it is determined, at block 714, that the cumulative cost metric (e.g., the sum of the distance to an architected resource use for all of the registers on the pending last-use register list) is not greater than a cost threshold, then processing continues at block 720 to determine if there are more instructions in an IR for inclusion in the object code. If there are no additional instructions, then the process completes at block 722. If there are additional instructions, then processing continues at block 704, where a next instruction is selected.

If it is determined, at block 710, that the source operand does not represent a last use of a register, then processing continues at block 720 to determine if there are more instructions in an IR for inclusion in the object code. If there are no additional instructions, then the process completes at block 722. If there are additional instructions, then processing continues at block 704, where a next instruction is selected.

Those skilled in the art will understand that the methods described for accounting for a tradeoff between emitting an extra instruction to indicate last use and the benefits derived therefrom can also be used to model overheads associated with embodiments that indicate a last use of a register as part of an existing instruction. When this is performed, for example, using an instruction set where a last-use indicator is specified by way of instruction prefixes, overheads such as, but not limited to, increased fetch bandwidth and possible reduced decode bandwidth may be modeled.

Those skilled in the art will understand while embodiments have been described herein with respect to registers, other architected resources (e.g., storage addresses in a cache that may be excluded from write back in a write-back cache, or cache lines for which the last use has occurred and that may be excluded from cache coherence protocol snoops, or be filtered out from such protocols using snoop filters, e.g., as taught by Salapura et al., in "Design and Implementation of the Blue Gene/P Snoop Filter", Conference on High-Performance Computer Architecture, 2008) may be used in conjunction with the teachings contained herein.

A compiler, such as the enhanced compiler 70, may also modify the prologue and epilogues of object code modules in order to preserve the integrity of liveness status across function calls. The modifications allow the compiler to generate linkage code with liveness status based on ABI conventions. The ABI conventions for PowerPC classify registers as non-volatile (e.g., GPR14-GPR31), volatile (e.g., GPR3-GPR12), dedicated (e.g., GPR1-GPR2), and reserved (e.g., GPR 13). The floating point ABI conventions for System z® specify f0-f7 as volatile and f8-f15 as callee-saved.

In accordance with ABI conventions, several registers are defined to be volatile across function returns (i.e., the called function can overwrite values in these registers) and the calling function needs to save any data in these volatile registers before performing a function call. Some of the volatile registers contain a defined value on function entry (if the corresponding parameter is present). Also in accordance with ABI conventions, other registers are non-volatile across function returns and data contents of non-volatile registers do not need to be saved before performing a function call. The non-volatile registers may be used by a callee (i.e., the called function or called code), but they must be saved prior to use and restored prior to return to the caller (i.e., the calling function or calling code). If the non-volatile registers are unused in the caller, then they will remain unused unless and until used by the callee. If the non-volatile registers are used by the caller and used by the callee, the register is unused after saving the value in the prologue until its first use by the callee. Those skilled in the art will understand that for scheduled prologues, the value becomes unused at the point it is stored. If the non-volatile register is used by the callee (but not the caller), restoration by the epilogue of a stale value will cause value to appear live.

The following example includes functions F and G which are separately compiled. Function F (the caller) includes code to call function G (the callee). In keeping with ABI conventions, function F saves the values of any volatile registers currently being used by function F prior to calling function G. The prologue of function G (i.e., at function entry) includes instructions to save any non-volatile registers updated by function G. When function G has completed processing, epilogue code is executed to restore the values of the non-volatile registers so that they have the same values that they did upon entry to function G. After the prologue has completed processing, function G returns control to function F. As soon as function F receives control back from function G, it restores the values of the volatile registers so that they have the same values that they did prior to calling function G. Suppose that non-volatile register X is used by function G but it is not used by function F. Function G does not know whether or not function F uses non-volatile register X and function G saves the contents of register X upon entry and restores the value of register X upon exit. Upon return to function F it looks like register X is used because of the restore performed in the prologue of function G. Thus, an inconsistency is caused because register X is unused upon entry to function G and used upon exit from function G. Because of this inconsistency, registers that are unused appear to be used and thus use up resources. Removing this inconsistency results in the ability to de-allocate (or to consider de-allocating) additional unused registers.

Referring now to the generation of register liveness status across function calls, code generation may be performed by the compiler using at least two general methods. The first method is to indicate liveness in DFG in accordance with ABI conventions (as described above) and then to emit a last-use indicator. This first approach addresses all scenarios with the exception of handling callee-saved registers which are saved and restored by the callee (and after restoration the restored values appear to be "live" even if they were unused in the caller). The second method described herein generates code as part of call sites and/or prologues and epilogues to mark unused registers in accordance with the ABI in order to avoid this problem with an unused register appearing to be a used register upon a function return.

An embodiment of the first method includes ensuring that all ABI registers are properly indicated as live or volatile at the beginning of a prologue and at the end of an epilogue in accordance with ABI conventions. A prologue and an epilogue are inserted into the IR by the compiler. Code may be added in by the compiler to perform special handling for preserving liveness status for callee saved registers which were unused in the caller (e.g., in accordance with one aspect of the template based method described below). Those skilled in the art will understand how to use the methods outlined above in conjunction with this approach. In an exemplary embodiment of ABI handling in conjunction with an IR based function-call, epilogue and prologue generation, the pending last-use register list described previously is initialized to a list of the volatile unused (non-parameter) registers at the beginning of the function, and a test of whether to emit a last-use indicator instruction immediately at function entry is performed.

Similarly, those skilled in the art will understand how to generate code to perform special handling for preserving liveness status for callee-saved registers which were unused in the caller in conjunction with the pending list method described above with respect to FIG. 7. One method is to make additional information about callers known (e.g., in conjunction with global program optimization) and for the compiler to generate additional last-use indicators that are consistent with the register liveness of all callers. In an embodiment, the prologue is extended by an instruction sequence to store the list of unused registers at runtime. In addition, the epilogue is extended by an instruction to restore the list of unused registers at runtime. In accordance with this embodiment, the instruction set supports two additional instructions: a store instruction (e.g., STORE LIVENESS D, B) and a load instruction (e.g., LOAD LIVENESS D, B). In an embodiment, the store instruction stores a liveness vector to memory, the load instruction loads the liveness vector from memory, and the liveness vector includes bits that correspond to the registers.

The exemplary STORE LIVENESS instruction stores liveness data corresponding to a plurality of architected resources. In accordance with one embodiment, a single bit is used to indicate use/unuse of each architected resource. In one embodiment, the liveness vector is stored to a memory location specified by the address "D, B"—or "D(B)" corresponding to a sum of a displacement D and a base register B (also known as D-Form in the Power ISA). Those skilled in the art will undertand that other addressing forms, such as X forms of the Power ISA, or memory forms in accordance with the System z ISA such as "D(B,X)" specifying displacement, base and index registers, or any other known addressing form, may be used.

The exemplary LOAD LIVENESS instruction loads liveness data corresponding to a plurality of architected resources. In accordance with one embodiment, a single bit is used to indicate use/unuse of each architected resource. In one embodiment, the liveness vector is loaded from a memory location specified by the address "D, B"—or "D(B)" corresponding to a sum of a displacement D and a base register B (also known as D-Form in the Power ISA). Those skilled in the art will understand that other addressing forms, such as X forms of the Power ISA, or memory forms in accordance with the System z ISA such as "D(B,X)" specifying displacement, base and index registers, or any other known addressing form, may be used. When an indication that a register is non-live (i.e., dead, or unused) is loaded corresponding to an architected register that was previously live, the physical resources associated to the architected resource may be de-allocated. When an indication that a register is live (i.e., used is loaded corresponding to an architected register that was previously not live (dead, unused), a specification error may be raised, the resource may be maintained as unused and the corresponding liveness indication ignored and non-updated, or a resource may be allocated and loaded with a predetermined or undefined value.

It may not be desirable to restore liveness status for all registers. For example, a register may be unused when entering a function, but carry the computed function result on function exit. Simply restoring the entire liveness vector could cause the computed function result to be lost (e.g., by deallocating the physical register holding the computed result value). In accordance with an embodiment, the compiler generates additional code in the prologue and epilogue to update the liveness vector. In the function prologue an instruction sequence such as: STORE LIVENESS 40(SP); OI 40(SP), 128 is generated to store liveness to a location 40+SP (i.e., at 40 bytes from the stack pointer), and then OR-Immediate 128 into the stored value at the specified address 40+SP, to make the first architected resource be loaded with a liveness status of "live" when the liveness vector is reloaded by a subsequent LOAD LIVENESS instruction by setting the leftmost (most significant) bit corresponding to an architected resource to "1" indicating it being used in accordance with one definition of liveness vectors, where a "1" indicates that a resource is used. In the function epilogue an instruction sequence such as LOAD LIVENESS 40(SP) is generated to restore the liveness status stored by the instructions in the prologue. Note that the instruction sequence in the prologue modify the liveness status for register 0 to show it to be live (e.g., because it may carry a result value) prior to saving it. This example assumes that a vector set bit is used to indicate a live register.

Those skilled in the art will understand that other registers can similarly be undefined regardless of caller state, and that this can be achieved by either emitting separate last-use indicators after a load liveness instruction or by modifying the liveness vector to force a register to be non-live. For example, the following code sequence stores liveness status from a caller and indicates that register 2 is not live. In the function prologue: STORE LIVENESS 40(SP); NI 40(SP), (255-64) is generated by the compiler to store liveness to a location 40+SP (i.e., at 40 bytes from the stack pointer), and then AND-Immediate with 191 into the stored value at the specified address 40+SP, to make the second architected resource be loaded with a liveness status of "not live" when the liveness vector is reloaded by a subsequent LOAD LIVENESS instruction by setting the second bit from the most significant bit corresponding to an architected resource to "0" indicating it being unused in accordance with one definition of liveness vectors, where a "1" indicates that a resource is used and a "0" indicates the resource is unused. In the function epilogue an instruction sequence such as LOAD LIVENESS 40(SP) is generated to restore the liveness vector that was saved by the instructions in the prologue.

In another example, registers are both added and removed from the vector. In the function prologue: STORE LIVENESS 40(SP); OI 40(SP), 128; NI 40(SP), (255-64) is generated by the compiler to to modified the liveness vector stored by "STORE LIVENESS" to force a first resource corresponding to the most significant bit in the liveness vector to be indicated as used upon reload, and a second resource corresponding to the second most significant bit in the liveness vector to be indicated as unused upon reload. In the function epilogue an instruction sequence such as LOAD LIVENESS 40(SP) is generated to restore the liveness vector that was saved by the instructions in the prologue In a further embodiment, the compiler, during code generation, generates code for an instruction set that further includes mask bits to automatically override one or more registers as live or dead. One instruction encoding has two mask fields: LOAD LIVENESS D(B), M1, M2, where the liveness vector is set to the value LIVENESS=((MEM[D+B]) OR M1) AND M2.

In another aspect, load and store each have one mask field, and a store instruction performs an OR of the mask with the LIVENESS register value prior to storing to memory, and the load instruction performs an AND of the loaded memory value with the mask prior to updating liveness, as follows: STORE LIVENESS D(B), M1, where the memory is set to the value: MEM[B+D]=LIVENESS OR M, LOAD LIVENESS D(B), M; and the liveness vector is set to the value: LIVENESS=MEM[D+B] AND M. Those skilled win the art will understand that conversely, AND can be performed in conjunction with store liveness, and OR can be performed in conjunction with LOAD LIVENESS. In a RISC architecture, STORE LIVENESS and LOAD LIVENESS may be replaced with move from SPR and move to SPR (where the SPR indicated refers to a special purpose register indicating liveness). In at least one embodiment, move to SPR when the liveness register is the target, indicates a last use of the general purpose register.

Embodiments of the second method that generates code as part of call sites and/or prologues and epilogues to mark dead registers in accordance with the ABI are described next. This second method is an alternate way of code generation to reflect ABI behavior. In one embodiment it is used in conjunction with code generation that has otherwise not been updated to generate liveness status for the code. In another embodiment it is used to generate a template to enable generation of liveness indicating instructions in conjunction with a code generation method that generates prologues and epilogues based on templates. Function call boundaries capture many invalidated registers and are an attractive point to exploit the register liveness capability in code generation.

Figure 8:
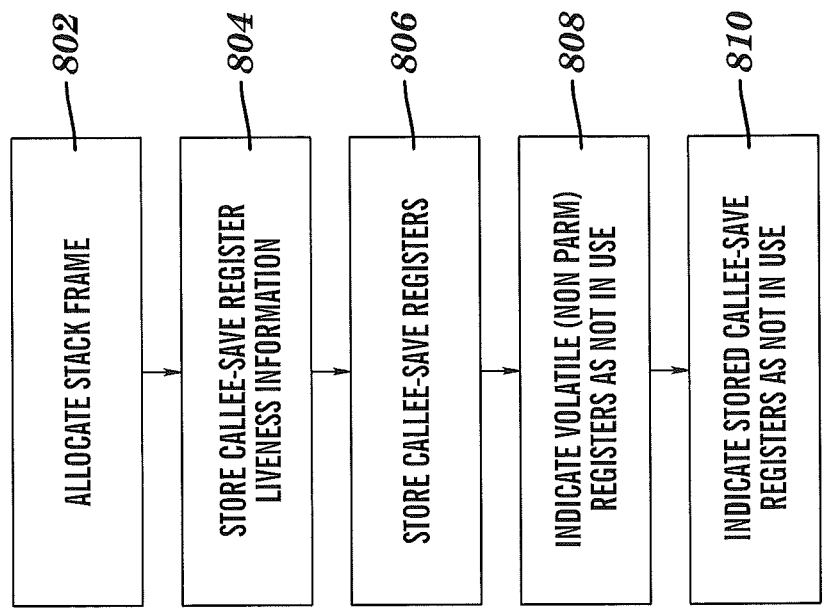
FIG. 8 illustrates a flow diagram of exemplary instructions inserted by a compiler into a prologue in accordance with an embodiment of the present invention.

FIG. 8 depicts a flow diagram of instructions inserted by a compiler into a prologue in accordance with an exemplary embodiment. In an embodiment, the enhanced compiler inserts the instructions into the prologue. At block 802, upon entry into the code module an instruction to allocate the stack frame is inserted. At block 804, an instruction to store a register liveness status to indicate which of the non-volatile registers are currently marked as live and which are marked as unused by the caller program is inserted into the prologue. In at least one embodiment, the liveness vector is stored in a stack frame with a STORE LIVENESS instruction as described herein.

At block 806, an instruction is inserted into the prologue to store non-volatile registers that are updated by the callee program. In an embodiment, accesses to non-live registers generate an error notification event. The compiler uses a store instruction to suppress the notification for spill code because the code may be called from some users where a store is necessary, and from other users where a store is unnecessary. To avoid error notification when the store is unnecessary and reflecting a scenario that would typically reflect a programming error, the compiler uses a new store that suppresses errors indicating when storing non-live register At block 808, an instruction is inserted to mark all volatile non-parameter registers as unused. In an embodiment, a single indicator instruction is generated by the compiler to load this formation. For example, an instruction such as "LOAD LIVENESS IMMEDIATE" or "LOAD LIVENESS from a constant pool" may be inserted into the prologue At block 810, an instruction is inserted to mark all stored callee saved registers as unused. This may be performed by indicating last use in each store of a callee-saved register, or alternatively by loading a mask (e.g., with LOAD LIVENESS, or as part of another instruction, e.g., a CALL instruction which also stores callee-saved registers). In an embodiment, a LOAD LIVENESS IMMEDIATE or a LOAD LIVENESS instruction is inserted to update liveness based on both volatility as per ABI and for callee-saved registers that have been saved.

In an embodiment adapted to store liveness for callee-saved registers, the liveness register is stored as part of the prologue (and before indicating the non-use of callee-saved registers that have been saved by the callee). This may be performed as previously described.

Figure 9:
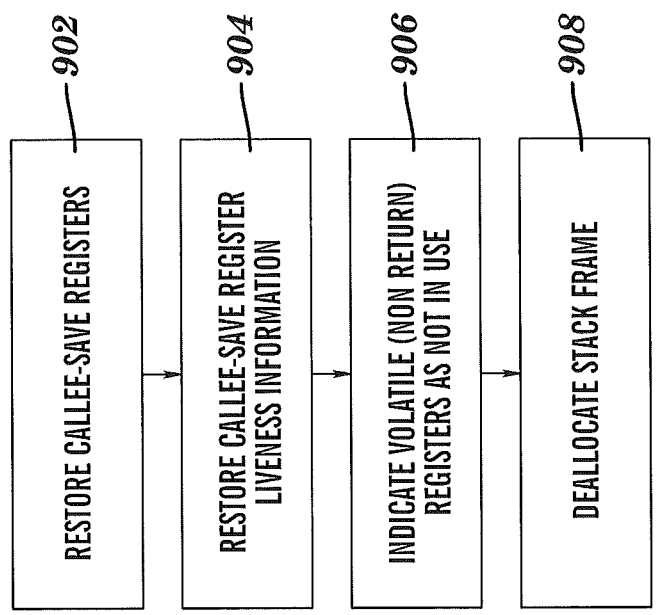
FIG. 9 illustrates a flow diagram of exemplary instructions inserted by a compiler into an epilogue in accordance with an embodiment of the present invention.

FIG. 9 depicts a flow diagram of instructions inserted by a compiler into an epilogue in accordance with an exemplary embodiment. In an embodiment, the instructions are inserted into the epilogue by the enhanced compiler 70. At block 902, an instruction is inserted to restore the non-volatile registers saved by the callee in the prologue. At block 904, the compiler inserts an instruction in the epilogue to restore the liveness status associated with the saved non-volatile registers that was saved in the prologue. Thus, this instruction restores the caller's liveness status for callee-save registers. In one embodiment, a RET instruction is used to restore automatically from the stack, when a CALL instruction has been used to save liveness status on the stack. At block 906, an instruction is inserted to mark as unused volatile registers that do not include a return value. At block 908, the compiler inserts an instruction to de-allocate the the frame stack.

In one embodiment, instructions to update all volatile registers (excluding function return registers) are inserted (e.g., LOAD LIVENESS, LOADLIVENESS IMMEDIATE or a CALL instruction which performs subroutine call and performs operations commonly associated with a function prologue as part of the call insertion, or the MTSPR "move to SPR (special purpose register)" instruction in accordance with at least one RISC embodiment of the present invention wherein the liveness vector is loaded first into a GPR and then moved into the LIVENESS SPR with an MTSPR instruction. In one embodiment, an instruction specifies that return registers are indicated as not live (or unused) when the function has no return value. In another embodiment, the return registers are never indicated as unused.

During actual execution of the object code, in at least one scenario the condition of accessing a register which is not live may correspond to a programming error. As such, a microprocessor implementation may be adapted to raise a notification event (e.g., an exception to one of a debugger, an operating system, a hypervisor, or another supervisory program) to indicate a possible programming error.

However, not all references to free registers are a programming error. Programs are required to save registers when they do not know whether those registers are in use. And hence they may proceed to save to memory ("spill") and later reload ("fill") these registers (e.g., during context switch or function call/return). In one aspect of an embodiment, there is provided a configuration register and a mode switch to override a possible exception, and force the returning of a default value. In another aspect of the invention, a control bit (e.g., in the PSW, a CR, or the MSR status registers, or in an implementation controlled HID bit) is set to select the behavior by an application. In another aspect, a prefix provides the ability to indicate that an unused reference might occur. In yet another aspect, an instruction with a well defined opcode has the ability to access a register that is thus freed and deallocated.

In another aspect of this management, notification raising and non-notification raising instructions are provided that raise or suppress notifications corresponding to non-live, disabled operands. A compiler generates an instruction that does not raise a programming error indicator event (e.g., said exception) but rather returns a default value when a context switch or callee-save spill/fill register sequence is performed. In accordance with one inventive aspect, the compiler uses one of the described means (set control, use of a prefix, or use of a special opcode) to perform key operations that may reference unused registers. Examples includes register save and restore for callee-saved (non-volatile) registers in function prologues and epilogues, during a makecontext/getcontext operation, or during a setjump/longjump operation. In another aspect of these operations, the compiler library or function will also be optionally adapted to emit and/or use and/or execute code to save a digest of register liveness status ("STORE LIVENESS"), and restore such information when registers are being reloaded ("LOAD LIVENESS").

In other aspects, operating systems and hypervisors use similar sequences of instructions to save and restore context in context switch. In one aspect of such a use, operating systems and hypervisors are expected to be free of programming errors, and to never raise a programming error notification, but rather to always substitute a default value. This would be desirable for a known highly reliable operating system such as z/OS and AIX. In another aspect, where an operating system (OS) expects there to be many programming errors in an OS, a method similar to application programs would be used, with the OS and the hypervisor being adapted to indicate a programming error (e.g., using a notification method), and using instructions adapted to not raise programming error notifications for operations such as context switches, which are known to be referencing unused/free/deallocated registers. These methods would be desirable for relatively unstable OSs. In addition, makers of very stable OS such as z/OS and AIX may choose to enable notification during their lengthy quality assurance cycle, to aid in debug and to preserve the known industry-leading stability in the z/OS and AIX operating systems. In another aspect, the mode may be switched, e.g., in a Linux operating system, where a more stable base Linux operating system may call external modules and drivers to be executed in the OS environment, the operating system may switch to a mode wherein programming error notification are enabled during execution of said drivers or modules.

Specific code examples have been used herein to illustrate various optimizations that may be performed by the enhanced compiler 70. These examples are not intended to limit embodiments of the present invention and those skilled in the art will appreciate that other code sequences may be utilized to perform the processing described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for preserving register liveness status across function calls comprising:
    inserting, by a compiler executing on a computer, into a prologue of a callee function configured to be called from a caller function, a first instruction configured to store a copy of loaded liveness data to memory when executed, the stored liveness data identifying which registers of a processor are unused by the caller function upon entry to the callee function at runtime; and
    inserting, by the compiler, into an epilogue of the callee function, a second instruction configured to restore, from the memory, the stored liveness data as the loaded liveness data when executed.

2. The method claim 1, further comprising:
    inserting, by the compiler, into the prologue of the callee function after the first instruction, an instruction configured to modify the loaded liveness data to identify all volatile non-parameter registers as unused; and
    inserting, by the compiler, into the epilogue of the callee function after the second instruction, an instruction configured to modify the loaded liveness data to identify all volatile registers that do not include a return value as unused.

3. The method of claim 1, wherein the liveness data is represented as a vector comprising a plurality of bits, wherein each of the bits corresponds to one of the registers and indicates whether the corresponding register is used or unused.

4. A computer program product comprising a tangible computer-readable storage medium storing instructions which, when executed by a processor, perform a method for preserving register liveness status across function calls comprising:
    inserting, by a compiler executing on a computer, into a prologue of a callee function configured to be called from a caller function, a first instruction configured to store a copy of loaded liveness data to memory when executed, the stored liveness data identifying which registers of the processor are unused by the caller function upon entry to the callee function at runtime; and
    inserting, by the compiler, into an epilogue of the callee function, a second instruction configured to restore, from the memory, the stored liveness data as the loaded liveness data when executed.

5. The computer program product of claim 4, wherein the method further comprises:
    inserting, by the compiler, into the prologue of the callee function after the first instruction, an instruction configured to modify the loaded liveness data to identify all volatile non-parameter registers as unused; and
    inserting, by the compiler, into the epilogue of the callee function after the second instruction, an instruction configured to modify the loaded liveness data to identify all volatile registers that do not include a return value as unused.

6. The computer program product of claim 4, wherein the liveness data is represented as a vector comprising a plurality of bits, wherein each of the bits corresponds to one of the registers and indicates whether the corresponding register is used or unused.

7. A system comprising a processor and a memory storing instructions which, when executed by the processor, perform a method for preserving register liveness status across function calls comprising:
    inserting, by a compiler executing on a computer, into a prologue of a callee function configured to be called from a caller function, a first instruction configured to store a copy of loaded liveness data to memory when executed, the stored liveness data identifying which registers of the processor are unused by the caller function upon entry to the callee function at runtime; and inserting, by the compiler, into an epilogue of the callee function, a second instruction configured to restore, from the memory, the stored liveness data as the loaded liveness data when executed.

8. The system of claim 7, wherein the method further comprises:

inserting, by the compiler, into the prologue of the callee function after the first instruction, an instruction configured to modify the loaded liveness data to identify all volatile non-parameter registers as unused; and inserting, by the compiler, into the epilogue of the callee function after the second instruction, an instruction configured to modify the loaded liveness data to identify all volatile registers that do not include a return value as unused.

9. The system of claim 7, wherein the liveness data is represented as a vector comprising a plurality of bits, wherein each of the bits corresponds to one of the registers and indicates whether the corresponding register is used or unused.

* * * * *